US012449670B2

(12) United States Patent
Adema et al.

(10) Patent No.: US 12,449,670 B2
(45) Date of Patent: Oct. 21, 2025

(54) OPTICAL ELEMENTS FOR DISPLAYS

(71) Applicant: GOOGLE LLC, Mountain View, CA (US)

(72) Inventors: Daniel Adema, Kitchener (CA); Ian Andrews, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 658 days.

(21) Appl. No.: 17/764,657

(22) PCT Filed: Jan. 8, 2021

(86) PCT No.: PCT/US2021/012704
§ 371 (c)(1),
(2) Date: Mar. 29, 2022

(87) PCT Pub. No.: WO2021/142263
PCT Pub. Date: Jul. 15, 2021

(65) Prior Publication Data
US 2022/0326537 A1 Oct. 13, 2022

Related U.S. Application Data

(60) Provisional application No. 62/959,417, filed on Jan. 10, 2020.

(51) Int. Cl.
*G02B 27/10* (2006.01)
*F21V 8/00* (2006.01)
*G02B 27/01* (2006.01)

(52) U.S. Cl.
CPC ......... *G02B 27/102* (2013.01); *G02B 6/0023* (2013.01); *G02B 27/0172* (2013.01); *G02B 2027/0178* (2013.01)

(58) Field of Classification Search
CPC ... G02B 27/01–0189; G02B 2027/0105–0198; G02B 6/00–567
See application file for complete search history.

(56) References Cited

U.S. PATENT DOCUMENTS

| | | | |
|---|---|---|---|
| 2017/0248790 A1* | 8/2017 | Cheng | G02B 27/141 |
| 2018/0203236 A1* | 7/2018 | Shih | G02B 6/0026 |
| 2018/0267312 A1 | 9/2018 | Melli | |

FOREIGN PATENT DOCUMENTS

| | | |
|---|---|---|
| EP | 0325366 B1 | 7/1989 |
| WO | 2019122516 A1 | 6/2019 |

OTHER PUBLICATIONS

International Preliminary Report on Patentability mailed Jul. 21, 2022 for PCT Application No. PCT/US2021/012704, 7 pages.

(Continued)

*Primary Examiner* — Christopher A Lamb, II

(57) ABSTRACT

There is provided an optical element including a light guide, an incoupler, and a beam splitter disposed in an optical path of a display beam between the incoupler and a light engine to generate the display beam. The display beam may comprise first and second beams. The beam splitter may split the display beam to form a first offspring beam including the first beam and a first portion of the second beam, and to form a second offspring beam including a second portion of the second beam. The first and second offspring beams may be incident upon the incoupler at first and second incidence positions respectively. The first incidence position may be different than the second incidence position. The incoupler may direct at least a portion of each of the first and second offspring beams into the light guide to form incoupled first and second offspring beams respectively.

20 Claims, 12 Drawing Sheets

(56) References Cited

OTHER PUBLICATIONS

International Search Report and Written Opinion mailed Apr. 23, 2021 for corresponding International Application No. PCT/US2021/012704, 12 pages.
Translation of Chinese Office Action mailed May 23, 2024 for CN Application No. 202180005492.1, 15 pages.
Communication under Rule 71(3) EPC mailed May 3, 2024 for EP Application No. 21703120.2, 48 pages.
Translation of Notification for Patent Registration Formalities mailed Sep. 29, 2024 for CN Application No. 202180005492.1, 4 pages.

* cited by examiner

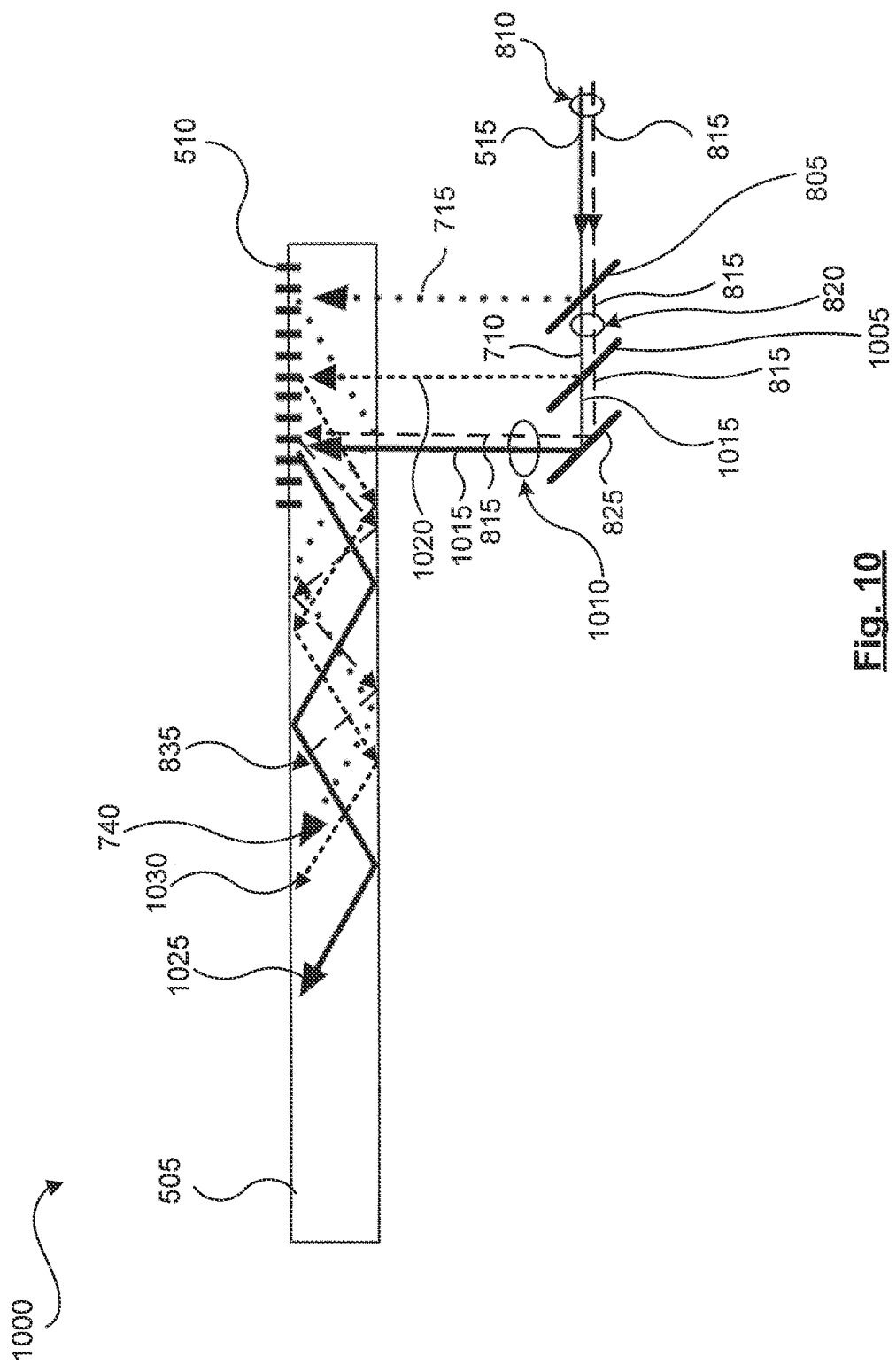

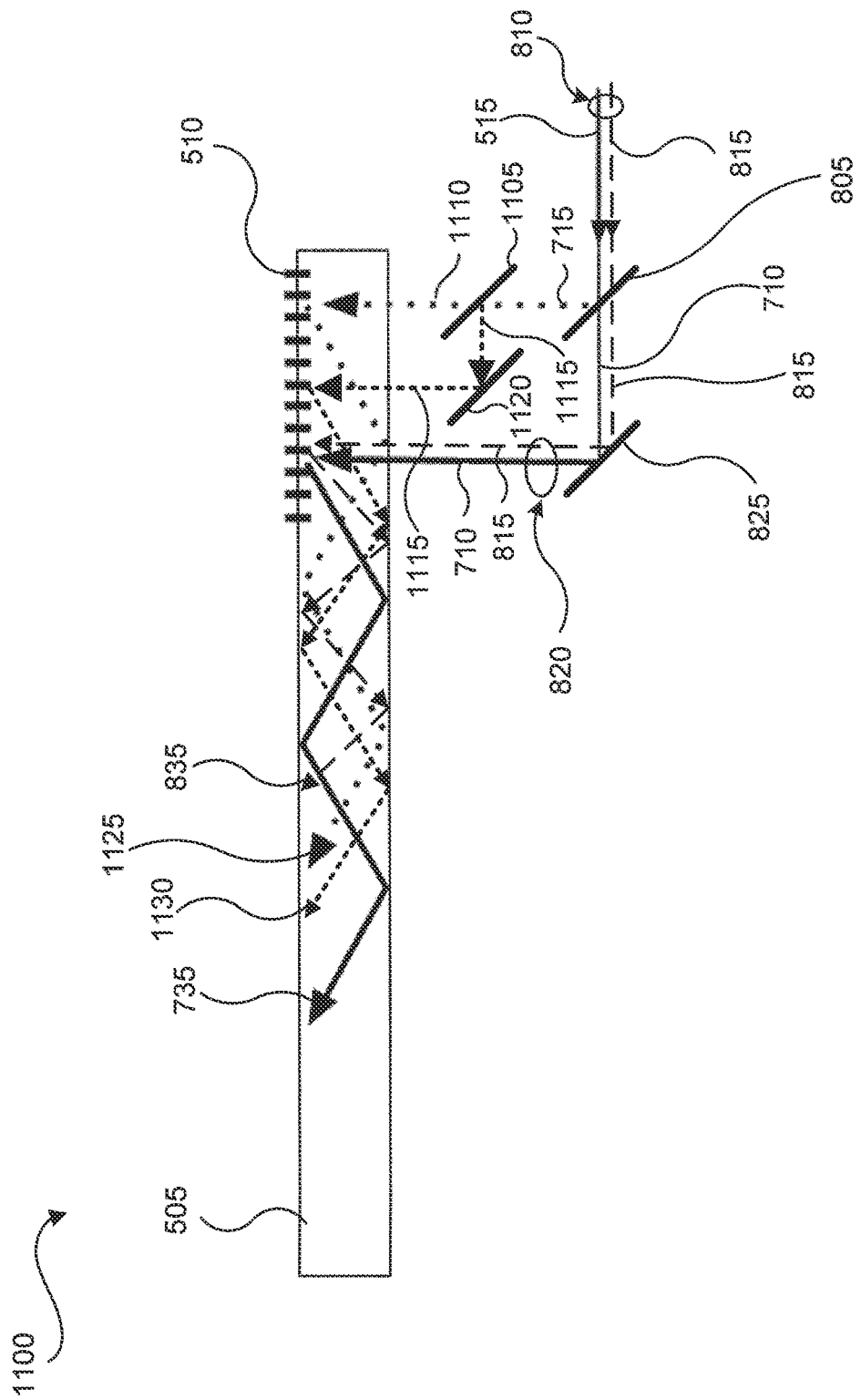

1200

Generating a display beam at a light engine, the display beam comprising a first beam and a second beam
1205

Splitting the display beam using a beam splitter to form a first offspring beam comprising the first beam and a first portion of the second beam, and to form a second offspring beam comprising a second portion of the second beam
1210

Directing the first offspring beam towards an incoupler to become incident upon the incoupler at a first incidence position, the incoupler optically coupled to a light guide
1215

Directing the second offspring beam towards the incoupler to become incident upon the incoupler at a second incidence position different than the first incidence position
1220

Directing, using the incoupler, at least a portion of each of the first offspring beam and the second offspring beam into the light guide to form an incoupled first offspring beam and an incoupled second offspring beam respectively
1225

Directing, using an outcoupler, at least a corresponding portion of each of the incoupled first offspring beam and the incoupled second offspring beam out of the light guide to form outcoupled beams propagating towards an eye of a user to form an image viewable by the user
1230

Fig. 12

OPTICAL ELEMENTS FOR DISPLAYS

CROSS-REFERENCE TO RELATED APPLICATIONS

The present application is a U.S. National Stage under 35 U.S.C. § 371 of International Patent Application Serial No. PCT/US2021/012704, entitled "OPTICAL ELEMENTS FOR DISPLAYS," and filed on Jan. 8, 2021, which claims priority to U.S. Provisional Application No. 62/959,417, entitled "OPTICAL ELEMENTS FOR DISPLAYS," and filed on Jan. 10, 2020, the entireties of which are incorporated by reference herein.

FIELD

The present specification relates to optical elements for displays, and to methods of operating said displays.

BACKGROUND

Displays may be used to form still or moving images. Some displays may use a display panel to form images. Examples of such display panels include Light Emitting Diode (LED) display panels, Liquid Crystal Display (LCD) panels, and the like. In addition, some displays may use projectors to project still or moving images. Small displays may be used to form, or as a part of, mobile or wearable devices. For example, some displays may form or be part of a wearable heads-up display.

SUMMARY

According to an implementation of the present specification there is provided an optical element including: a light guide; an incoupler optically coupled to the light guide; and a beam splitter disposed in an optical path of a display beam between the incoupler and a light engine to generate the display beam, the display beam including a first beam and a second beam, the beam splitter to split the display beam to form a first offspring beam including the first beam and a first portion of the second beam, and to form a second offspring beam including a second portion of the second beam, the first offspring beam and the second offspring beam incident upon the incoupler at a first incidence position and a second incidence position respectively, the first incidence position different than the second incidence position, the incoupler to direct at least a portion of each of the first offspring beam and the second offspring beam into the light guide to form an incoupled first offspring beam and an incoupled second offspring beam respectively.

The second beam may have a color associated with at least a wavelength that is longer than corresponding wavelengths associated with a corresponding color of the first beam.

The display beam may further include a third beam; and the beam splitter may be to split the display beam to form: the first offspring beam including the first beam, the first portion of the second beam, and the third beam; and the second offspring beam including the second portion of the second beam.

The optical element may further include a further beam splitter disposed in a corresponding optical path of the first offspring beam between the beam splitter and the incoupler, the further beam splitter to split the first offspring beam to form a third offspring beam including the first beam and a third portion of the second beam, and to form a fourth offspring beam including a fourth portion of the second beam.

The optical element may further include a further beam splitter disposed in a corresponding optical path of the second offspring beam between the beam splitter and the incoupler, the further beam splitter to split the second offspring beam to form a third offspring beam including a third portion of the second beam and a fourth offspring beam including a fourth portion of the second beam.

The beam splitter may include an about 50/50 beam splitter.

The incoupled second offspring beam may have a bounce length in the light guide; and a distance between the first incidence position and the second incidence position may be other than an integer multiple of the bounce length.

The optical element may further include an outcoupler optically coupled to the light guide, the outcoupler to direct at least a corresponding portion of each of the incoupled first offspring beam and the incoupled second offspring beam out of the light guide to form outcoupled beams propagating towards an eye of a user to form an image viewable by the user.

The beam splitter may include a dichroic partial reflector.

The incoupler may include a diffractive optical element.

According to another implementation of the present specification there is provided a method of operating a display to form an image viewable by a user, the method including: generating a display beam at a light engine, the display beam including a first beam and a second beam; splitting the display beam using a beam splitter to form a first offspring beam including the first beam and a first portion of the second beam, and to form a second offspring beam including a second portion of the second beam; directing the first offspring beam towards an incoupler to become incident upon the incoupler at a first incidence position, the incoupler optically coupled to a light guide; directing the second offspring beam towards the incoupler to become incident upon the incoupler at a second incidence position different than the first incidence position; directing, using the incoupler, at least a portion of each of the first offspring beam and the second offspring beam into the light guide to form an incoupled first offspring beam and an incoupled second offspring beam respectively; and directing, using an outcoupler, at least a corresponding portion of each of the incoupled first offspring beam and the incoupled second offspring beam out of the light guide to form outcoupled beams propagating towards an eye of the user to form the image viewable by the user.

The generating the display beam including the first beam and the second beam at the light engine may include generating the second beam having a color associated with at least a wavelength that is longer than corresponding wavelengths associated with a corresponding color of the first beam.

The generating the display beam may include generating the display beam including the first beam, the second beam, and a third beam; and the splitting the display beam may include splitting the display beam using the beam splitter to form: the first offspring beam including the first beam, the first portion of the second beam, and the third beam; and the second offspring beam including the second portion of the second beam.

The method may further include: splitting the first offspring beam using a further beam splitter to form: a third offspring beam including the first beam and a third portion of the second beam; and a fourth offspring beam including a fourth portion of the second beam.

The method may further include: splitting the second offspring beam using a further beam splitter to form: a third offspring beam including a third portion of the second beam; and a fourth offspring beam including a fourth portion of the second beam.

The splitting the display beam may include splitting the display beam using an about 50/50 beam splitter.

The directing the first offspring beam towards the incoupler and the directing the second offspring beam towards the incoupler may include directing the first offspring beam towards the incoupler to become incident upon the incoupler at the first incidence position and directing the second offspring beam towards the incoupler to become incident upon the incoupler at the second incidence position respectively, a distance between the first incidence position and the second incidence position being other than an integer multiple of a bounce length of the incoupled second offspring beam in the light guide.

The splitting the display beam may include splitting the display beam using the beam splitter including a dichroic partial reflector.

The directing at least the portion of each of the first offspring beam and the second offspring beam into the light guide may include directing, using the incoupler including a diffractive optical element, at least the portion of each of the first offspring beam and the second offspring beam into the light guide.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 10 shows a schematic, cross-sectional representation of yet another example optical element, in accordance with a non-limiting implementation of the present specification.

FIG. 11 shows a schematic, cross-sectional representation of yet another example optical element, in accordance with a non-limiting implementation of the present specification.

FIG. 12 shows a flowchart of an example method of operating a display, in accordance with a non-limiting implementation of the present specification.

DETAILED DESCRIPTION

Figure 1:
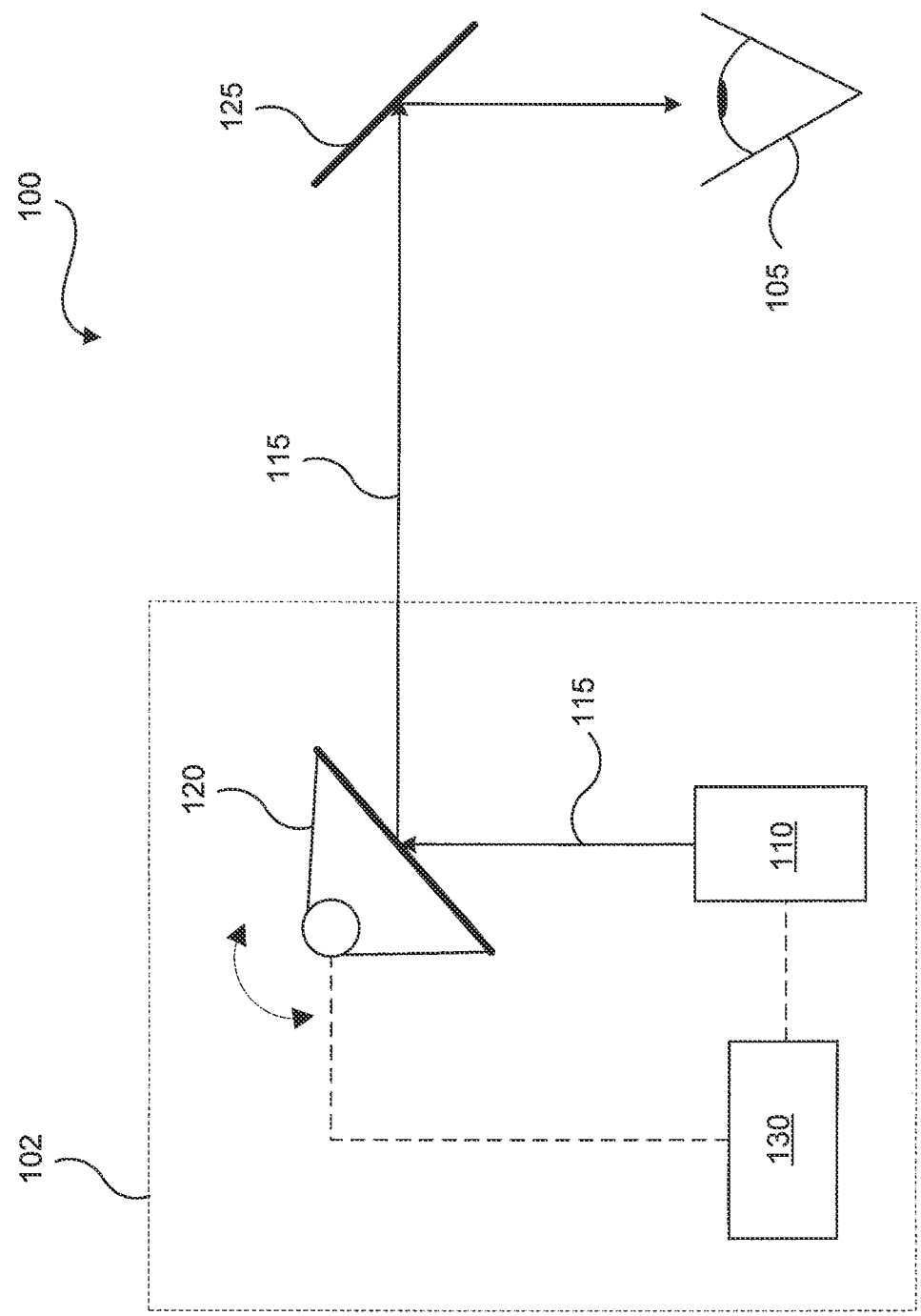
FIG. 1 shows a schematic representation of an example system which may be used to form or project an image, in accordance with a non-limiting implementation of the present specification.

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Throughout this specification and the appended claims, the term "carries" and variants such as "carried by" are generally used to refer to a physical coupling between two objects. The physical coupling may be direct physical coupling (i.e. with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, secured to, and/or supported by, with or without any number of intermediary physical objects therebetween.

Displays may use optical elements to guide and manipulate light to form images. Such optical elements may cause non-uniformities in the displayed images. Some of these non-uniformities may include variations in intensity or color balance across the field of the image. The field may include the array of pixels that form the image. Some of these non-uniformities may be detectable by a viewer of the display. The viewer of the display may also be described as the user of the display.

In some examples, an optical element may include a light guide and an incoupler (IC) optically coupled to the light guide. Moreover, in some examples, the IC may include a diffractive optical element, such as a surface relief grating (SRG), a hologram, or the like. The IC may receive a display beam generated by a light engine of the display that incorporates the optical element. The IC may then direct at least a portion of the display beam into the light guide to form an incoupled beam. The incoupled beam may then propagate within the light guide.

Furthermore, in some examples, the optical element may also include an outcoupler (OC). In addition, in some examples, the OC may also include a diffractive optical element such as a SRG, a hologram, or the like. The OC may be optically coupled to the light guide. Once the incoupled beam propagating within the light guide becomes incident upon the OC, the OC may direct at least a portion of the incoupled beam out of the light guide to form an outcoupled beam propagating towards an eye of a user of the display to form an image viewable by the user. It will be appreciated that the light guide can also be referred to as a waveguide. Example optical elements are described in greater detail in relation to FIGS. 3-11.

In color displays, the display beam may include beams of different colors. For example, the display beam may include red, green, and blue constituent beams. Different colors or combinations of colors may also be used. In some examples, the IC may direct each color beam of the display light into the light guide at a different angle based on the color (i.e., wavelength) of the beam. This, in turn, may cause the different color constituent beams of the display beam to have different bounce lengths within the light guide. As a result, beams with shorter bounce lengths may become incident upon the OC at bounce positions that are more closely spaced apart compared to the incidence positions of beams with relatively longer bounce lengths.

This difference between the spacings of the bounce positions of the different color beams on the OC may cause non-uniformities in the image displayed using the optical element. In some examples, such non-uniformities may include color balance non-uniformities. In some example optical elements, color beams corresponding to longer wavelengths may have a longer bounce length in the light guide (and correspondingly further spaced apart incidence positions on the OC) compared to color beams corresponding to relatively shorter wavelengths. This, in turn, may distort the color balance by favoring the colors of the color beams corresponding to the relatively shorter wavelengths, which may cause color balance non-uniformities in images formed using the display.

In order to reduce such image non-uniformities the light of one or more of the color beams at a given angle is introduced to the IC in multiple positions, thereby filling in, or reducing the size of, the spaces between the bounce positions of the beams of light. For example, two red beams, designated R1 and R2 respectively can be introduced to the IC at different positions. The bounce positions of the beam R2 in the light guide are closer to the bounce positions of the beam R1 than the distance between the bounce positions of the beam R1, thereby reducing non-uniformities in the red light. FIGS. 7-11 show example optical elements in which a color beam is introduced to the OC in multiple positions.

FIG. 12, in turn, shows a flowchart of an example method of operating a display, which method may also be used to introduce a color beam into the outcoupler in multiple positions to fill in or reduce the size of the spaces between the bounce positions of the beams. FIGS. 1-4 show example displays and display components which may incorporate the optical elements described herein.

Turning now to FIG. 1, a schematic representation of an example system 100 is shown. System 100 may be used to form or project an image viewable by an eye 105 of a viewer. System 100 may also be referred to or described as an image projection device, a display device, a display system, or a display. The viewer may also be described as a user of system 100. System 100 may include a light engine 102 to generate a beam of output light 115. In some examples, light engine 102 may include a light source 110 to generate output light 115. Output light 115 may also be described as a display beam. In some examples, light engine 102 may generate a display beam including a plurality of different color beams. Such multi-color display beams may allow system 100 to form color images.

Moreover, in some examples, light source 110 may include at least one laser, at least one light emitting diode, and the like. Light engine 102 may also include a spatial modulator 120 to receive output light 115 from light source 110. In some examples, spatial modulator 120 may include a movable reflector, a micro-electro-mechanical system (MEMS), a digital micromirror device (DMD), and the like. In some examples, spatial modulator 120 may be part of a relay optic of system 100.

While FIG. 1 shows light engine 102 as including spatial modulator 120, it is contemplated that in some examples light engine 102 need not include spatial modulator 120 or light source 110. In some examples, light engine 102 may include a micro-display, or other light sources suitable for forming an image.

Furthermore, system 100 may include a display optic 125 to receive output light 115 from light engine 102 and direct the output light towards eye 105 of a user of the WHUD to form an image viewable by the user. In some examples, display optic 125 may include a light guide and an IC optically coupled to the light guide. Moreover, in some examples, display optic 125 may also include an OC optically coupled to the light guide. Furthermore, in some examples the display optic may be, or may include, one or more of the optical elements described herein, such as the optical elements described in relation to FIGS. 7-11, and the like.

Moreover, in some examples system 100 may be a part of or incorporated into a wearable heads-up display (WHUD). Such a heads-up display may have different designs or form factors, such as the form factor of eyeglasses, as is described in greater detail in relation to FIG. 2. In examples where system 100 is in the form factor of glasses, display optic 125 may be on or in a lens of the glasses.

In addition, in some examples light engine 102 may include a controller 130 in communication with light source 110 and spatial modulator 120. Controller 130 may control light source 110 and spatial modulator 120 to project an image. In some examples, the image to be projected may be a still image, a moving image or video, an interactive image, a graphical user interface, and the like.

In some examples, the controllers described herein such as controller 130 may include a processor in communication with a non-transitory processor-readable medium. The processor-readable medium may include instructions to cause the processors to control the light source and the spatial modulator to form images viewable by the user of system 100. Moreover, in some examples the controllers may be free-standing components, while in other examples the controllers may include functional modules incorporated into other components of their respective systems.

Furthermore, in some examples the controllers or their functionality may be implemented in other ways, including:

via Application Specific Integrated Circuits (ASICs), in standard integrated circuits, as one or more computer programs executed by one or more computers (e.g., as one or more programs running on one or more computer systems), as one or more programs executed by one or more controllers (e.g., microcontrollers), as one or more programs executed by one or more processors (e.g., microprocessors, central processing units, graphical processing units), as firmware, and the like, or as a combination thereof.

Figure 2:
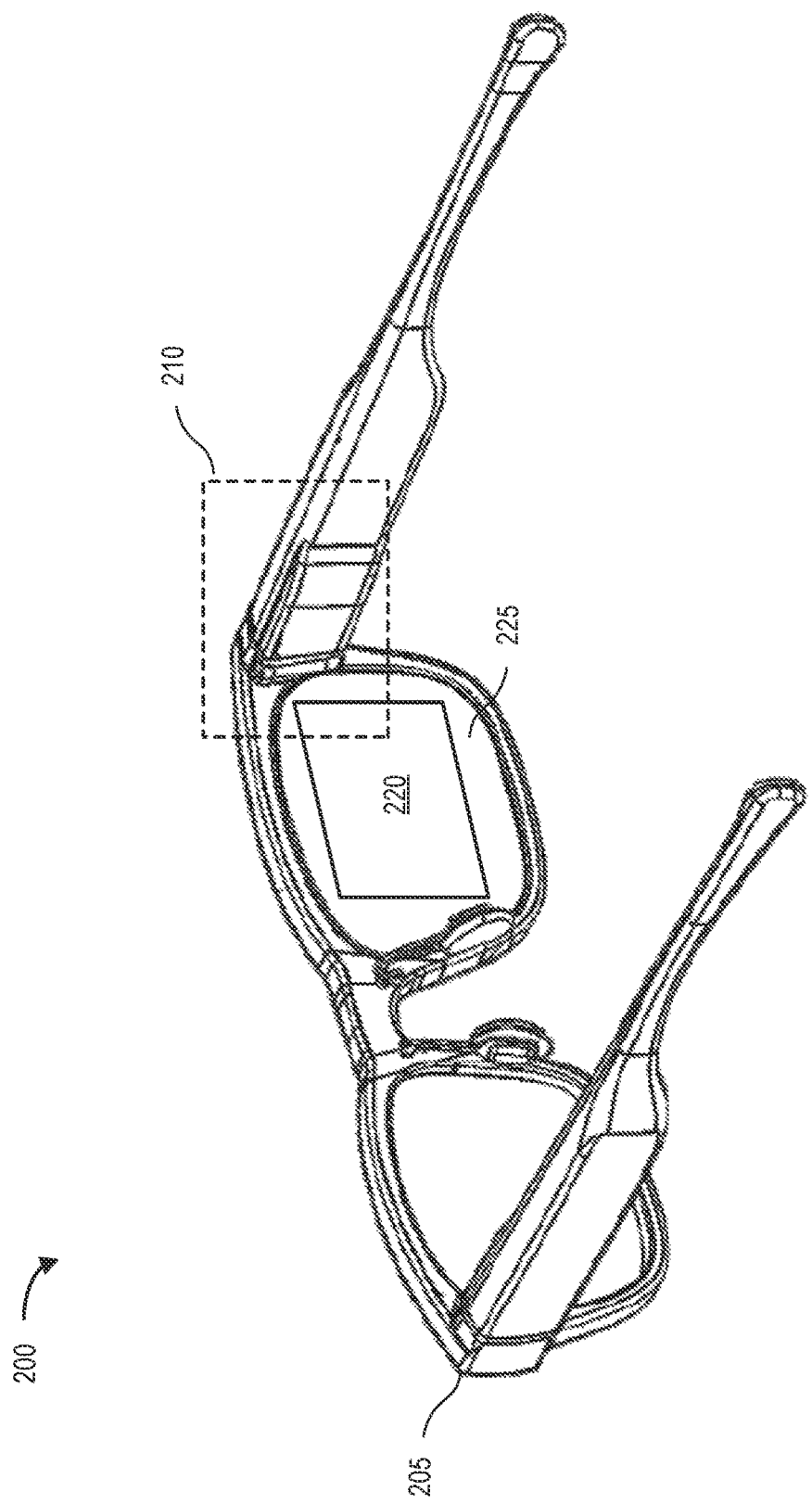
FIG. 2 shows a partial-cutaway perspective view of an example wearable heads-up display, in accordance with a non-limiting implementation of the present specification.

Turning now to FIG. 2, a partial-cutaway perspective view of an example wearable heads-up display (WHUD) 200 is shown. WHUD 200 includes a support structure 205 that in use is worn on the head of a user and has the general form factor and appearance of an eyeglasses (e.g. sunglasses) frame. Eyeglasses or sunglasses may also be generically referred to as "glasses". Support structure 205 may carry components of a system to display an image, such as system 100. For example, light engine 102 may be received in a space 210 in a side arm of support structure 205.

The spatial modulator of the systems described herein may be received in or be part of a component located in or near space 210 of support structure 205. The spatial modulator in turn may direct the output light onto a display optic 220 carried by a lens 225 of support structure 205. In some examples, display optic 220 may be similar in structure or function to display optic 125. Moreover, in some examples display optic 220 may be, or may include, one or more of the optical elements described herein, such as the optical elements described in relation to FIGS. 7-11, and the like.

Figure 3:
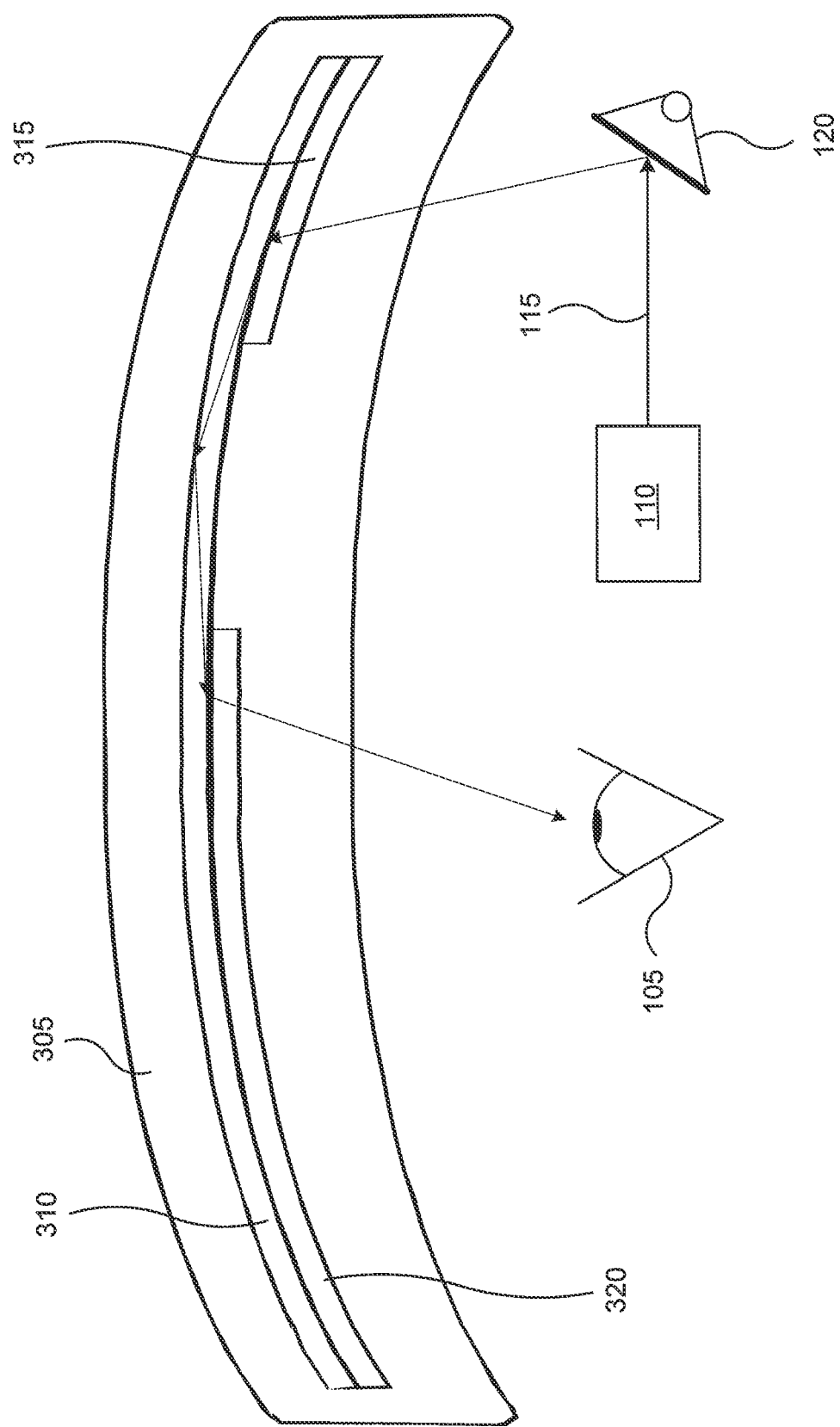
FIG. 3 shows a schematic cross-sectional representation of an example lens of an example wearable heads-up display, in accordance with a non-limiting implementation of the present specification.

Turning now to FIG. 3, a schematic cross-sectional representation is shown of an example lens 305 of an example WHUD. The components in FIG. 3 are not cross-hatched to allow for a clearer illustration of the path of an example ray of light traversing these components. In some examples, lens 305 may be used as lens 225 in WHUD 200. Lens 305 has embedded within it a display optic, which display optic may be, or include an optical element. It is contemplated that in some examples, the optical element may include one or more of the optical elements described herein, such as the optical elements described in relation to FIGS. 7-11, and the like.

The optical element includes a light guide 310, and an IC 315 and an OC 320 affixed to, embedded in, or integrated with light guide 310. IC 315 may direct at least a portion of output light 115 into light guide 310 to form an incoupled beam. OC 320, in turn, may outcouple from light guide 310 a portion of the incoupled beam to form an outcoupled beam propagating towards eye 105 of a viewer. While not shown in FIG. 3, it is contemplated that in some examples, OC 320 may also act an exit pupil expander (EPE) and generate a plurality of exit pupils (EPs) that may enter eye 105 and become viewable by the user of the WHUD incorporating lens 305.

Moreover, it is contemplated that in some examples, the display optic shown in FIG. 3 may be used as display optic 125 in system 100. In some examples, light guide 310 may guide light within it using total internal reflection. IC 315 may receive an incoming beam of light, such as output light 115 generated by light source 110. IC 315 may then redirect output light 115 towards light guide 310 at an angle that allows output light 115 to enter light guide 310, and to travel through or within light guide 310. Total internal reflection may prevent output light 115 from leaking from the walls of light guide 310.

Once output light 115 that is travelling in light guide 310 reaches and becomes incident upon OC 320, OC 320 may direct a portion of output light 115 out of light guide 310 and towards eye 105 of a user. In some examples, the combination of light guide 310, IC 315, and OC 320 may be described as an optical element. Such an optical element may be used as, or as a part of, display optic 125 in system 100 or display optic 220 in WHUD 200.

Figure 4:
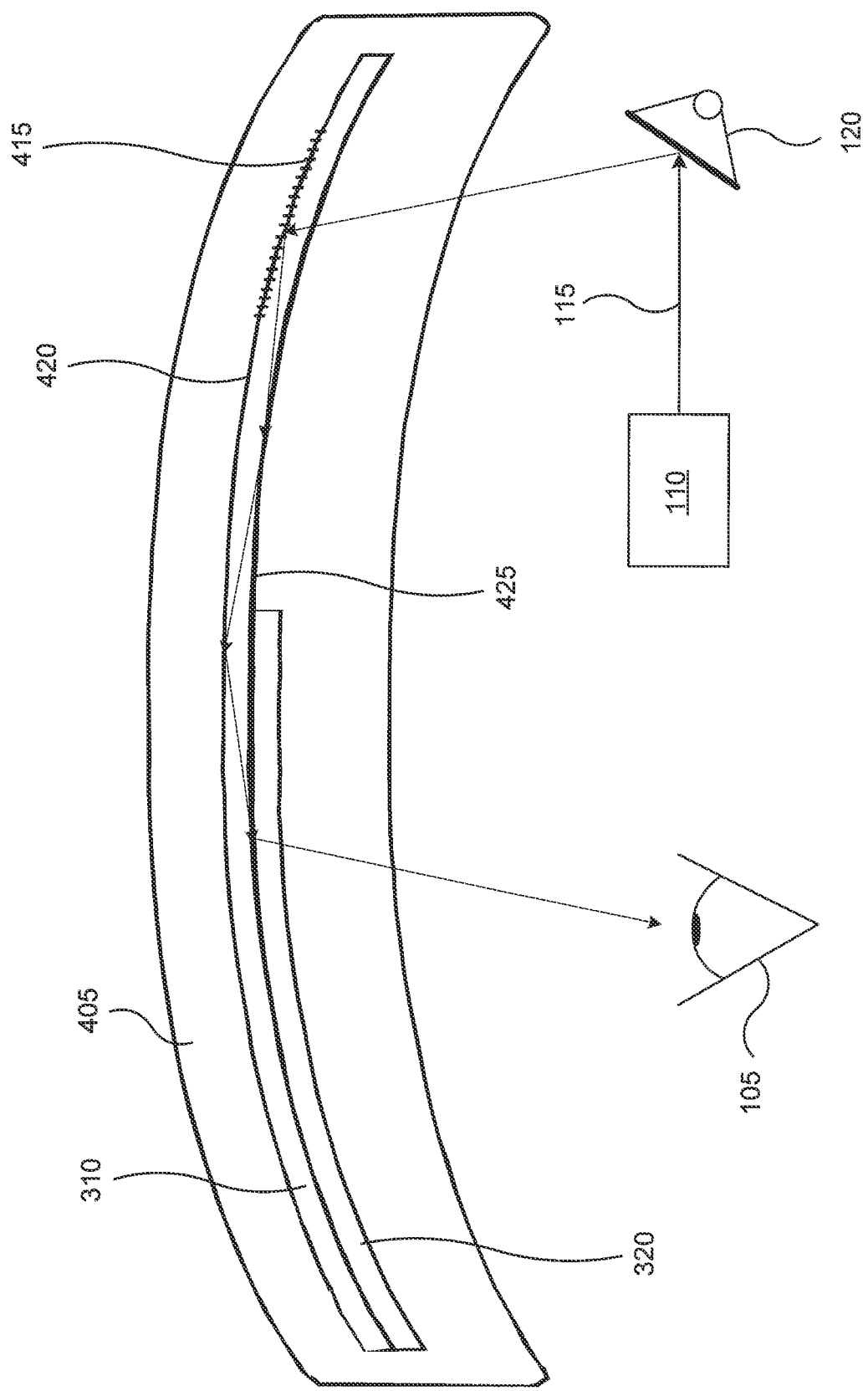
FIG. 4 shows a schematic cross-sectional representation of another example lens of an example wearable heads-up display, in accordance with a non-limiting implementation of the present specification.

FIG. 4, in turn, shows a schematic cross-sectional representation of an example lens 405 of an example WHUD. The components in FIG. 4 are not cross-hatched to allow for a clearer illustration of the path of an example ray of light traversing these components. Lens 405 may have a similar structure and function as lens 305. In addition, lens 405 may be used in similar displays or WHUDs as lens 305. A difference between lenses 405 and 305 is that in the optical element of lens 405 an IC 415 is disposed proximate a surface 420 of light guide 310 opposite another surface 425 that carries OC 320. In this configuration, output light 115 propagating from spatial modulator 120 passes through light guide 310 before becoming incident upon IC 415.

In some examples, IC 415 may include a diffractive optical element. Moreover, in some examples, IC 415 may include a hologram disposed proximate surface 420 of light guide 310. Furthermore, in some examples, IC 415 may include a SRG at or near surface 420. It is also contemplated that in some examples, the OC may also include a diffractive optical element disposed at or near surface 420 of light guide 310. In some examples, the combination of light guide 310, IC 415, and OC 320 may be described as an optical element. The optical element of lens 405 may also be used as, or as a part of, display optic 125 in system 100 or display optic 220 in WHUD 200.

Figure 5:
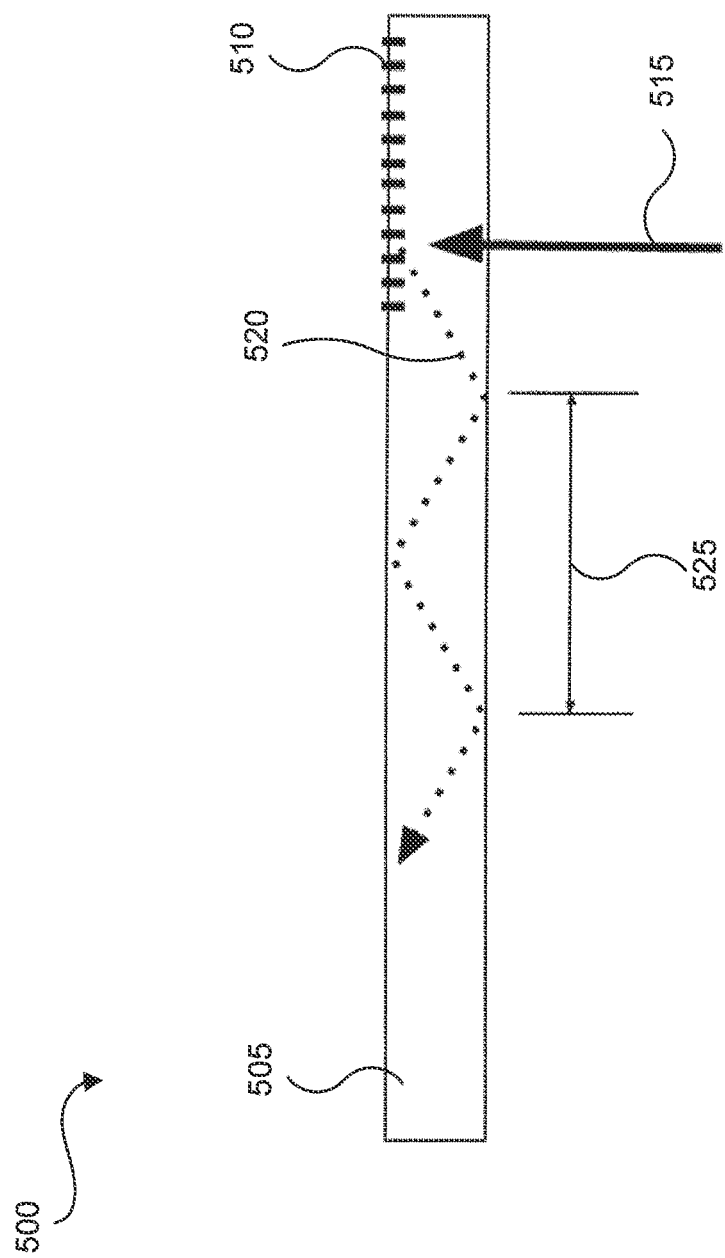
FIG. 5 shows a schematic, cross-sectional representation of an example optical element.

FIG. 5 shows a schematic cross-sectional representation of an example optical element 500. Optical element 500 includes a light guide 505 and an IC 510 optically coupled to light guide 505. In some examples, light guide 505 may include glass, an optical grade plastic, or other optical grade materials suitable for conducting light. Moreover, in some examples, IC 510 may include a diffractive optical element such as a SRG, a hologram, and the like. IC 510 may receive a display beam 515 generated by a light engine (not shown in FIG. 5). IC 510 may then direct at least a portion of display beam 515 into light guide 505 to form an incoupled beam 520. While not shown in FIG. 5, it is contemplated that in some examples optical element 500 may also include an OC optically coupled to light guide 505. In some examples, this OC may be carried by light guide 505. Similarly, while the optical elements shown in FIGS. 7-11 are shown without an OC, it is contemplated that in some examples, these optical elements may also each include a corresponding OC optically coupled to, or carried by, their respective light guides.

FIG. 5 also shows a distance 525 between bounce positions of incoupled beam 520. As discussed above, in some examples the distance 525 may be a function of the color or wavelength of display beam 515. In some examples, a shorter wavelength display beam may have a shorter distance between bounce positions and a relatively longer wavelength display beam may have a relatively longer distance between bounce positions.

Figure 6:
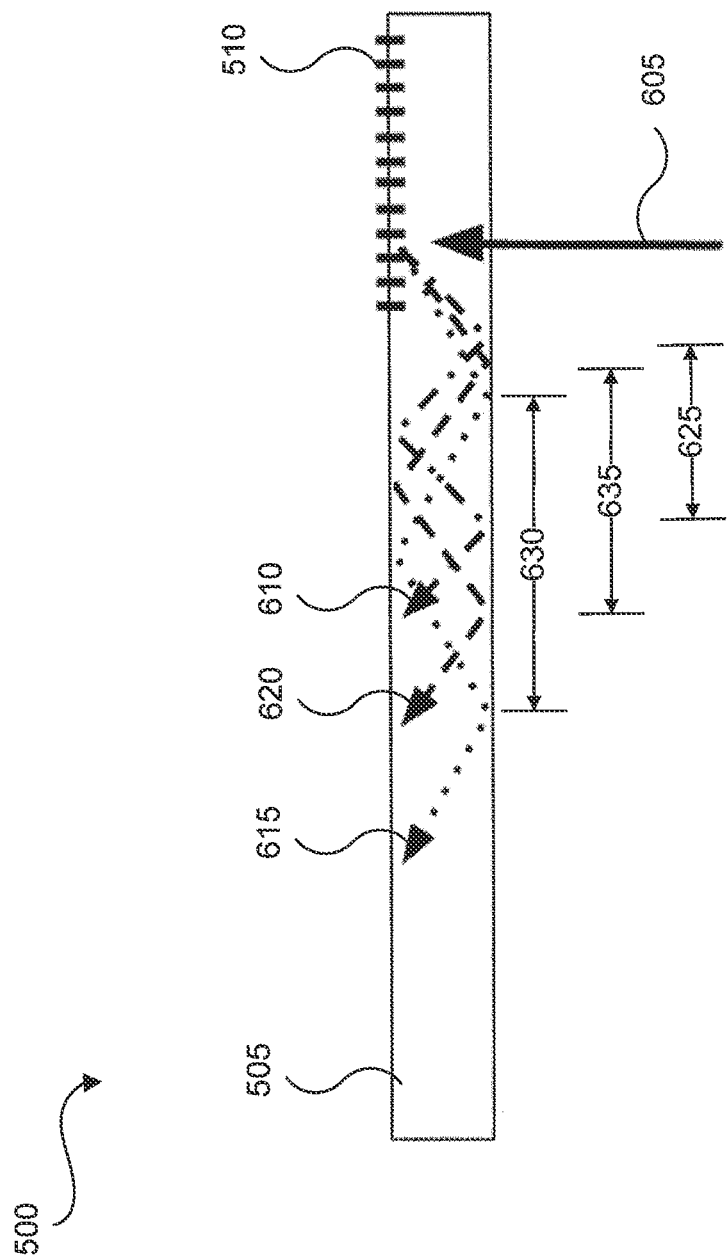
FIG. 6 shows another schematic, cross-sectional representation of the optical element shown in FIG. 5.

FIG. 6 also shows a schematic cross-sectional representation of optical element 500. In FIG. 6, a display beam 605 is received by IC 510. Display beam 605 includes three constituent color beams. In this description, "constituent color beams" may also be referred to as "color constituent beams". The color beam having the shortest wavelength is incoupled by IC 510 into light guide 505 to form incoupled beam 610.

The color beam having the longest wavelength is incoupled by IC 510 into light guide 505 to form incoupled beam 615. Moreover, the color beam having the wavelength intermediate between the shortest and the longest wavelengths is incoupled by IC 510 into light guide 505 to form incoupled beam 620.

As shown in FIG. 6, incoupled beam 610 having the shortest wavelength has a shortest distance 625 between bounce positions in light guide 505. Incoupled beam 615 having the longest wavelength has a longest distance 630 between bounce positions in light guide 505. Furthermore, incoupled beam 620 having the intermediate wavelength has a distance 635 between bounce positions in light guide 505. Distance 635 is intermediate between distances 625 and 630.

Figure 7:
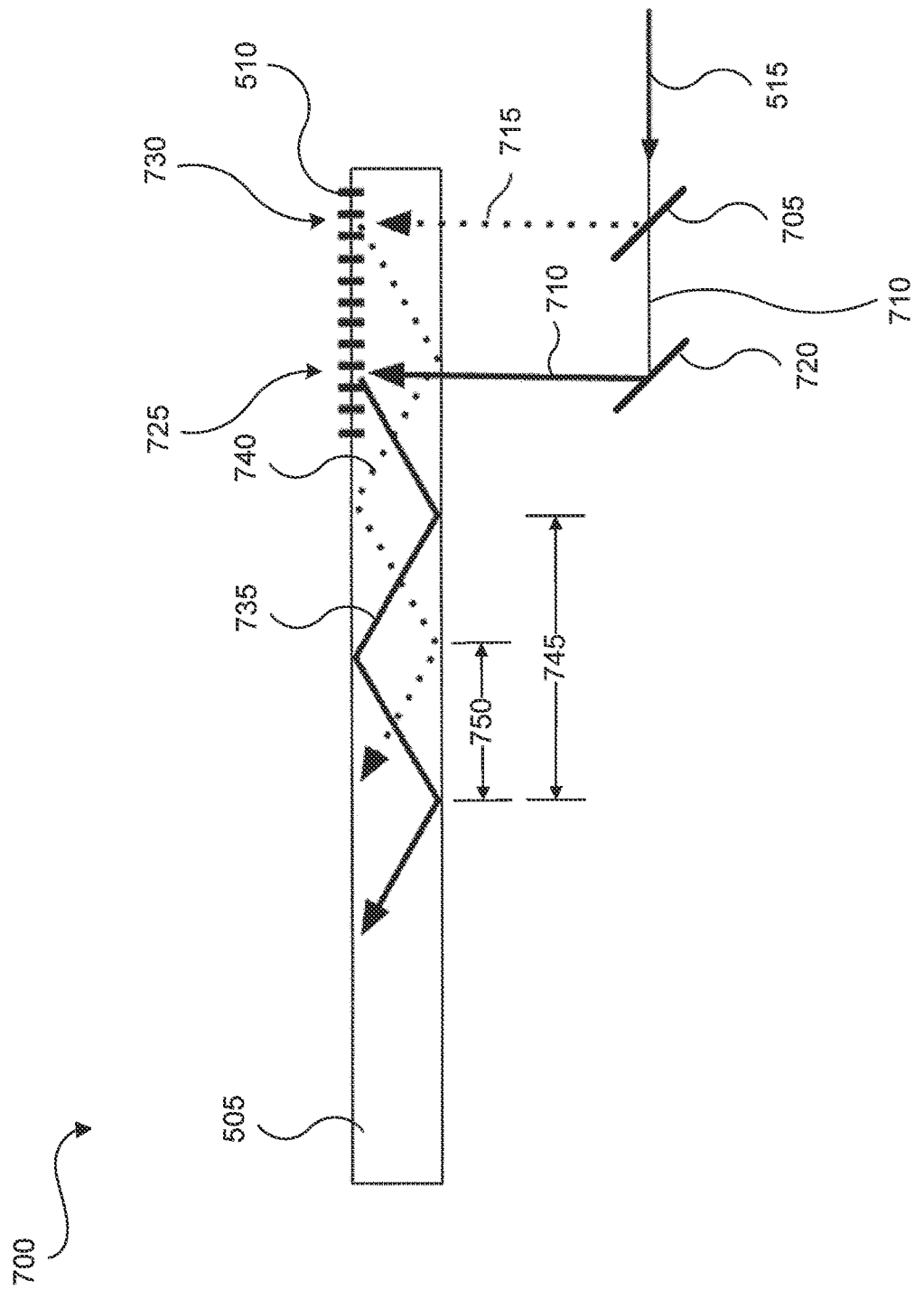
FIG. 7 shows a schematic, cross-sectional representation of another example optical element, in accordance with a non-limiting implementation of the present specification.

Turning now to FIG. 7, a schematic, cross-sectional representation of an example optical element 700 is shown. Optical element 700 includes light guide 505 and IC 510 optically coupled to light guide 505. In addition, optical element 700 includes a beam splitter 705 disposed in the optical path of display beam 515 from a light engine (not shown in FIG. 7) that generated the display beam to IC 510. Beam splitter 705 splits display beam 515 to form a first offspring beam 710 and a second offspring beam 715.

In some examples, beam splitter 705 may split display beam 515 by transmitting a first portion of display beam 515 to form offspring beam 710 and by reflecting a second portion of display beam 515 to form offspring beam 715. As display beam 515 includes one color beam, offspring beams 710 and 715 have the same color or wavelength. Optical element 700 also includes a reflector 720 to direct offspring beam 710 towards IC 510. Offspring beam 710 then becomes incident upon IC 510 at an incidence position 725. Beam splitter 705 directs offspring beam 715 towards IC 510, where offspring beam 715 then becomes incident upon IC 510 at an incidence position 730.

As shown in FIG. 7, incidence positions 725 and 730 may be spaced from one another. IC 510 then directs a portion of each of offspring beams 710 and 715 into light guide 505 to form a first incoupled offspring beam 735 and a second incoupled offspring beam 740 respectively. As incoupled offspring beams 735 and 740 have the same wavelengths, they have distance 745 between bounces in light guide 505. Since the incidence positions 725 and 730 are offset from one another on IC 510, the bounce positions of incoupled offspring beams 735 and 740 on walls of light guide 505 are also correspondingly offset from one another.

As discussed above, incoupled offspring beams 735 and 740 have a wavelength that is the same or substantially the same as the wavelength of display beam 515. The offsetting of bounce positions of the incoupled offspring beams in light guide 505 may allow for the incoupled beams having the wavelength of display beam 515 to have a distance 750 between bounces of the different beams that is shortened relative to distance 745. That is, the distance 750 represents the distance between a bounce position of the beam 735 and the closest bounce position of the beam 515, and this distance 750 is less than the distance 745.

So long as the distance between incidence positions 725 and 730 is other than an integer multiple of spacing 745, the offset between incidence positions 725 and 730 translates into a corresponding offset between the bounce positions of the incoupled offspring beams in light guide 505. This offset between the bounce positions in the light guide, in turn, yields a distance, between bounce positions that is shortened compared to distance 745, thereby reducing non-uniformities.

While optical element 700 uses a reflector 720 to direct offspring beam 710 towards IC 510, it is contemplated that in some examples, different types, numbers, or arrangements of optical components may be used to direct the offspring beams onto the IC such that they become incident upon the IC at respective incidence positions that are offset from one another. For example, it is contemplated that in some examples, optical element 700 need not include reflector 720. In such examples, beam splitter 705, alone or in combination with one or more other optical components, may be used to direct the offspring beams towards IC 510. Examples of such optical components may include reflectors, lenses, prisms, light guides, and the like.

Figure 8:
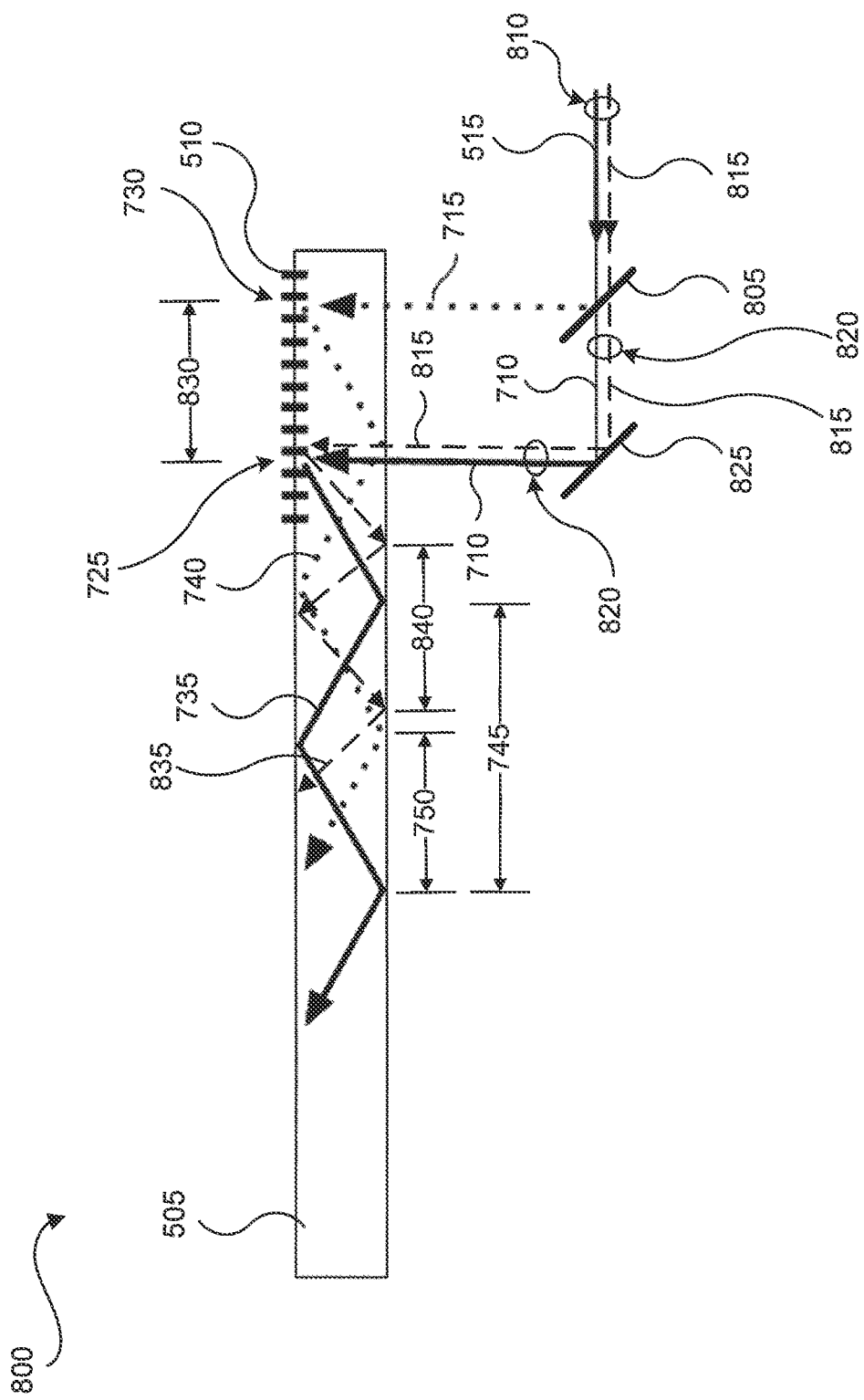
FIG. 8 shows a schematic, cross-sectional representation of yet another example optical element, in accordance with a non-limiting implementation of the present specification.

Turning now to FIG. 8, a schematic, cross-sectional representation is shown of an example optical element 800. Similar to optical element 700, optical element 800 may include light guide 505 and IC 510 optically coupled to light guide 505. Optical element 800 may also include a beam splitter 805 to receive a display beam 810 generated by a light engine (not shown in FIG. 8). Display beam 810 includes a first beam 815 and a second beam 515. In some examples, beams 515 and 815 may include different colors or wavelengths.

In FIG. 8 constituent beams 515 and 815 of display beam 810 are shown as two distinct beams for illustrative purposes, and it is contemplated that in some examples, beams 515 and 815 may be coincident as constituent beams of a single display beam 810. It is also contemplated that in some examples, display beam 810 may include more than two constituent color beams each having a different color.

Beam splitter 805 is disposed in the optical path of display beam 810 from the light engine to IC 510. While FIG. 8 shows beam splitter 805 disposed at a given position and orientation relative to light guide 505, IC 510, and display beam 810, it is contemplated that in some examples, the beam splitter may be positioned or oriented differently relative to light guide 505, IC 510, and display beam 810.

Beam splitter 805 may split display beam 810 by transmitting beam 815, while partially reflecting beam 515 to form beam 715 and partially transmitting beam 515 to form beam 710. In this manner, beam splitter 805 may split display beam 810 to form a first offspring beam 820 and a second offspring beam 715. First offspring beam 820 may include beam 815 and beam 710. While in FIG. 8 constituent beams 815 and 710 of offspring beam 820 are shown as two distinct beams for illustrative purposes, it is contemplated that in some examples, beams 815 and 710 may be coincident as constituent beams of a single offspring beam 820.

In some examples, beam splitter 805 may include a dichroic partial reflector, and the like. Moreover, in some examples, beam splitter 805 may include an about 50/50 beam splitter. Such a 50/50 beam splitter may split beam 515 such that the intensity of beams 710 and 715 is about the same. It is also contemplated that in some examples, beam splitter 805 may be other than a 50/50 beam splitter. In still other embodiments, beam splitter 805 can be a polarization beam splitter.

Optical element 800 may include a reflector 825 to direct offspring beam 820 towards IC 510 to become incident upon IC 510 at an incidence position 725. Beam splitter 805 may direct offspring beam 715 to become incident upon IC 510 at incidence position 730. Incidence position 725 may be offset from incidence position 730 on IC 510 by a distance 830. IC 510 may, in turn, direct at least a portion of beams 710, 715, and 815 into light guide 505 to form incoupled beams 735, 740, and 835 respectively. As beams 710, 715, and 815 are offspring beams of display beam 810, incoupled beams 735, 740, and 835 may also be referred to as incoupled offspring beams.

Beam 515 may have a color associated with a wavelength that is longer than the wavelength associated with the color of beam 815. In some examples, beam 515 may be red, and beam 815 may be green or blue. In some examples, other colors and color combinations may also be used. As shown in FIG. 8, offspring beams 710 and 715 (and their corresponding incoupled beams 735 and 740) of beam 515 have a larger distance 745 between bounce positions in light guide 505 compared to the relatively shorter distance 840 between bounce positions of offspring beam 815 (and its corresponding incoupled beam 835).

Distance 830 between incidence positions 725 and 730 causes the bounce positions of incoupled beams 735 and 740 on the wall of light guide 505 to be offset from one another. This offsetting effect takes place so long as distance 830 is other than an integer multiple of bounce length 745. The offset between the bounce positions of incoupled beams 735 and 740 on the wall of light guide 505 may cause the distance 750 between corresponding bounce positions of the incoupled offspring beams of beam 515 (that is, the distance between the corresponding bounces of the offspring beams) to be shortened relative to distance 745.

This shortening distance between bounce positions may reduce the difference between the distance 840 associated with beam 815 having a shorter wavelength and the distance 745 associated with beam 515 having a relatively longer wavelength. In other words, the difference between the distance 750 and the distance 840 is reduced compared to the relatively larger difference between the distance 745 and the distance 840. This, in turn, may allow for reducing the difference between the distance between bounce positions of a longer-wavelength color constituent (e.g. red) of display beam 810 and the distance between bounce positions of a relatively shorter-wavelength color constituent (e.g. green or blue) of display beam 810.

Reducing the wavelength- or color-dependent differences between the distance between bounce positions of the various color constituents of the display beam in the light guide may, in turn, reduce color balance non-uniformities that may be caused by such bounce length differences in images formed by displays that use optical elements such as optical element 800.

While not shown in FIG. 8, it is contemplated that in some examples, optical element 800 may also include an OC optically coupled to light guide 505. This OC may receive incoupled offspring beams 735, 740, and 835 via light guide 505. The OC may then direct at least a corresponding portion of each of the incoupled offspring beams out of light guide 505 to form outcoupled beams (not shown in FIG. 8) propagating towards an eye of a user to form an image viewable by the user.

While optical element 800 uses a reflector 825 to direct offspring beam 820 towards IC 510, it is contemplated that in some examples, different types, numbers, or arrangements of optical components may be used to direct the offspring beams onto the IC such that they become incident upon the IC at respective incidence positions that are offset from one another. For example, it is contemplated that in some examples, optical element 800 need not include reflector 825. In such examples, beam splitter 805, alone or in combination with one or more other optical components, may be used to direct the offspring beams towards IC 510. Examples of such optical components may include reflectors, lenses, prisms, light guides, and the like.

Figure 9:
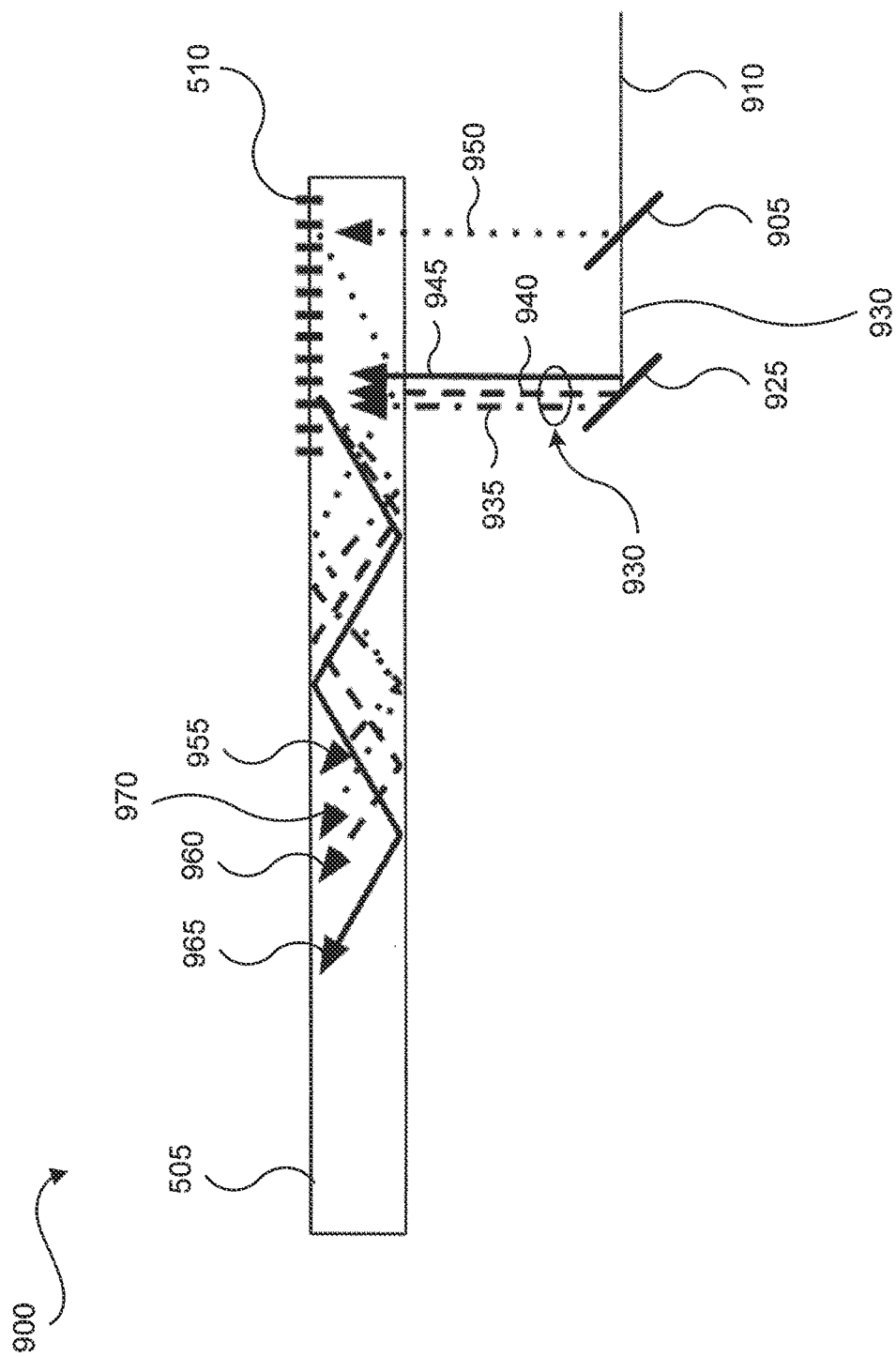
FIG. 9 shows a schematic, cross-sectional representation of yet another example optical element, in accordance with a non-limiting implementation of the present specification.

Turning now to FIG. 9, a schematic cross-sectional representation of an example optical element 900 is shown. Optical element 900 may be similar to optical element 800. Optical element 900 may include a beam splitter 905 positioned to receive a display beam 910 including three color constituent beams. Beam splitter 905 may split display beam 910 to form a first offspring beam 930 including the first and third color constituent beams 935, 940 and a first portion of the second color constituent beam 945 of display beam 910. Moreover, beam splitter 905 may split display beam 910 to form a second offspring beam 950 including a second portion of the second color constituent beam of display beam 910.

In order words, beam splitter 905 may transmit the first and third color constituent portions of display beam 910. Moreover, beam splitter 905 may partially transmit the second color constituent portion of display beam 910 to form offspring beam 945, and may partially reflect the second color constituent portion of display beam 910 to form offspring beam 950. In some examples, the second color constituent beam may be associated with a color associated with one or more wavelengths that are longer that the wavelengths associated with the colors of the first and third color constituent beams of display beam 910. In other words, in some examples, the color constituent beam being split by beam splitter 905 into a partially reflected portion and a partially transmitted portion may be the color constituent beam whose color is associated with the longest wavelength of the wavelengths associated with the colors of the constituent beams of display beam 910.

Furthermore, in some examples, the second color constituent beam may be associated with red, and the first and third color constituent beams may be associated with green and blue. Other colors and color combinations are also contemplated. Optical element 900 may also include a reflector 925 to direct offspring beam 930 towards IC 510. It is also contemplated that in some examples, optical element 900 need not include reflector 925, in which examples beam splitter 905, alone or in combination with one or more additional optical components, may direct offspring beam 930 towards IC 510. IC 510 may then direct at least a portion of each of beams 935, 940, 945, and 950 to form incoupled beams 955, 960, 965, and 970 respectively.

Turning now to FIG. 10, a schematic, cross-sectional representation is shown of an example optical element 1000. Optical element 1000 may be similar to optical element 800. A difference between optical elements 1000 and 800 may be that optical element 1000 includes a further beam splitter 1005 disposed in the optical path of first offspring beam 820 between beam splitter 805 and IC 510. Beam splitter 1005 may split offspring beam 820 to form a further offspring beam 1010 including beam 815 and an offspring beam 1015. Offspring beam 1015 may include a portion of beam 710 transmitted by beam splitter 1005.

Beam splitter 1005 may split offspring beam 820 to also form a yet further offspring beam 1020. Beam 1020 may include a portion of beam 710 reflected by beam splitter 1005. In this manner, offspring beams 715 and 1020 may include respective portions of beam 515, while offspring beam 1010 includes beam 815 and beam 1015, wherein beam 1015 is a further portion of beam 515. In some examples, beam 515 may have a color associated with one or more wavelengths that are longer than the wavelengths associated with the color of beam 815.

IC 510 may direct at least a portion of beams 1015, 815, 1020, and 715 to form incoupled offspring beams 1025, 835, 1030, and 740 respectively. Using the additional beam splitter 1005 to form the additional offspring beam 1020 incident upon IC 510 further reduces the distance between the incidence positions on IC 510 of the offspring beams of beam 515, which in turn further reduces the distance between bounce positions of incoupled offspring beams of beam 515 in light guide 505.

It is contemplated that in some examples, optical element 1000 may be used with a display beam that has three or more color constituent beams, similar to display beam 910 shown in FIG. 9. Moreover, while FIG. 10 shows a particular position and orientation of beam splitters 805 and 1005, it is contemplated that in some examples, different arrangements and orientations of beam splitters 805 and 1005 may be used. In addition, it is contemplated that in some examples optical element 1000 need not include reflector 825. Moreover, in some examples, optical element 1000 may include an OC optically coupled to light guide 505, which OC may outcouple corresponding portions of incoupled offspring beams 1025, 835, 1030, and 740 to form an image viewable by a user of a display incorporating optical element 1000.

Turning now to FIG. 11, a schematic, cross-sectional representation is shown of an example optical element 1100. Optical element 1100 may be similar to optical element 800. A difference between optical elements 1100 and 800 may be that optical element 1100 includes a further beam splitter 1105 disposed in the optical path of second offspring beam 715 between beam splitter 805 and IC 510. Beam splitter 1105 may split offspring beam 715 to form further offspring beams 1110 and 1115. Offspring beam 1110 may include a portion of beam 715 transmitted by beam splitter 1105, and offspring beam 1115 may include another portion of beam 715 reflected by beam splitter 1105. Furthermore, in some examples, optical element 1100 may also include a further reflector 1120 to direct offspring beam 1115 towards IC 510.

In this manner, offspring beams 1110 and 1115 may include respective portions of beam 515, while offspring beam 820 includes beam 815 and beam 710, wherein beam 710 is also a portion of beam 515. In some examples, beam 515 may have a color associated with one or more wavelengths that are longer than the wavelengths associated with the color of beam 815.

IC 510 may direct at least a portion of beams 710, 815, 1115, and 1110 to form incoupled offspring beams 735, 835, 1130, and 1125 respectively. Using the additional beam splitter 1105 to form the additional offspring beam 1115 incident upon IC 510 further reduces the distance between the incidence positions on IC 510 of the offspring beams of beam 515, which in turn further reduces the distance between bounce positions of incoupled offspring beams of beam 515 in light guide 505.

It is contemplated that in some examples, optical element 1100 may be used with a display beam that has three or more color constituent beams, similar to display beam 910 shown in FIG. 9. Moreover, while FIG. 11 shows a particular position and orientation of beam splitters 805 and 1105 and reflectors 825 and 1120, it is contemplated that in some examples, different arrangements and orientations of beam splitters 805 and 1105 or reflectors 825 and 1120 may be used. In addition, it is contemplated that in some examples optical element 1100 need not include reflectors 825 or 1120. Moreover, in some examples, optical element 1100 may include an OC optically coupled to light guide 505, which OC may outcouple corresponding portions of incoupled offspring beams 735, 835, 1130, and 1125 to form an image viewable by a user of a display incorporating optical element 1100.

While the optical elements shown in FIGS. 5-11 have their respective ICs positioned on a surface of the light guide similar to the configuration shown in FIG. 4, it is contemplated that In some examples, the optical elements shown in FIGS. 5-11 may have their ICs positioned on an opposing surface of the light guide, similar to the configuration shown in FIG. 3. It is also contemplated that in some examples, the optical elements may have their ICs positioned relative to their light guide in a configuration other than those shown in FIG. 3 or 4.

Moreover, the optical elements shown in FIGS. 7-11 and the other optical elements described herein may be used as display optics, or as a part of the display optics, in lenses 305 and 405, in WHUD 200, and in system 100.

Turning now to FIG. 12, a flowchart is shown of an example method 1200 of operating a display to form an image viewable by a user. Method 1200 may be used to reduce color balance non-uniformities of the images formed by the display. In some examples, method 1200 may be used to operate system 100, WHUD 200, and the other systems and displays described herein. Moreover, in some examples, method 1200 may be performed using, among other components, the optical elements described herein in relation to FIGS. 7-11, which optical elements may in turn be used as a component in system 100, WHUD 200, and the other systems and displays described herein.

At box 1205 of method 1200, a display beam may be generated at a light engine of the display. In some examples, the display beam may include a first beam and a second beam. Furthermore, at box 1210 the display beam may be split using a beam splitter to form a first offspring beam including the first beam and a first portion of the second beam, and to form a second offspring beam including a second portion of the second beam.

Moreover, at box 1215 the first offspring beam may be directed towards an incoupler to become incident upon the incoupler at a first incidence position. The incoupler may be optically coupled to a light guide. At box 1220, in turn, the second offspring beam may be directed towards the incoupler to become incident upon the incoupler at a second incidence position different than the first incidence position.

Furthermore, at box 1225 at least a portion of each of the first offspring beam and the second offspring beam may be directed into the light guide using the incoupler, to form an incoupled first offspring beam and an incoupled second offspring beam respectively. In addition, at box 1230 at least a corresponding portion of each of the incoupled first offspring beam and the incoupled second offspring beam may be directed out of the light guide using an outcoupler to form outcoupled beams propagating towards an eye of the user to form the image viewable by the user.

In some examples, generating the display beam including the first beam and the second beam at the light engine may include generating the second beam having a color associated with at least a wavelength that is longer than corresponding wavelengths associated with a corresponding color of the first beam.

Moreover, in some examples, generating the display beam may include generating the display beam including the first beam, the second beam, and a third beam. Splitting the display beam may include splitting the display beam using the beam splitter to form the first offspring beam including the first beam, the first portion of the second beam, and the third beam, and the second offspring beam including the second portion of the second beam.

Furthermore, in some examples, method 1200 may further include splitting the first offspring beam using a further beam splitter to form a third offspring beam including the first beam and a third portion of the second beam, and a fourth offspring beam including a fourth portion of the second beam. In addition, in some examples, method 1200 may further include splitting the second offspring beam using a further beam splitter to form a third offspring beam including a third portion of the second beam, and a fourth offspring beam including a fourth portion of the second beam.

In some examples, splitting the display beam may include splitting the display beam using an about 50/50 beam splitter. Moreover, in some examples, the beam splitter may include a dichroic partial reflector, and the like. Furthermore, in some examples, directing at least the portion of each of the first offspring beam and the second offspring beam into the light guide may include directing, using the incoupler including a diffractive optical element, at least the portion of each of the first offspring beam and the second offspring beam into the light guide.

In addition, in some examples, directing the first offspring beam towards the incoupler and directing the second offspring beam towards the incoupler may include directing the first offspring beam towards the incoupler to become incident upon the incoupler at the first incidence position and directing the second offspring beam towards the incoupler to become incident upon the incoupler at the second incidence position respectively. The distance between the first incidence position and the second incidence position may be other than an integer multiple of a bounce length of the incoupled second offspring beam in the light guide.

It is contemplated that method 1200 and the other methods described herein may be performed by system 100, WHUD 200, and the other systems, displays, and devices described herein. It is also contemplated that method 1200 and the other methods described herein may be performed by systems or devices other than the systems and devices described herein. In addition, it is contemplated that system 100, WHUD 200, optical elements 700, 800, 900, 1000, 1100, and the other systems, devices, and optical elements described herein may have some or all of the features and perform some or all of the functions described herein in relation to method 1200 and the other methods described herein. Moreover, system 100, WHUD 200, optical elements 700, 800, 900, 1000, 1100, and the other systems, devices, and optical elements described herein may have features and perform functions other than those described herein in relation to method 1200 and the other methods described herein.

Moreover, while FIGS. 3 and 4 show a given optical element having a given arrangement of light guide, incoupler, and outcoupler, it is contemplated that in some examples the optical element may have a different structure, and that the light guide, incoupler, and outcoupler may be arranged differently relative to one another. In addition, while some of the examples provided herein are described in the context of laser projectors and WHUDs, it is contemplated that the functions and methods described herein may be implemented in or by display systems or devices which may not use laser projectors or be WHUDs.

Throughout this specification and the appended claims, infinitive verb forms are often used. Examples include, without limitation: "to form," "to direct," "to split," "to generate," and the like. Unless the specific context requires otherwise, such infinitive verb forms are used in an open, inclusive sense, that is as "to, at least, form," to, at least, direct," "to, at least, split," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An optical element comprising:
   a light guide;
   an incoupler optically coupled to the light guide; and
   a beam splitter disposed in an optical path of a display beam representative of an image,
   the display beam comprising a first beam and a second beam, the second beam having a color associated with at least a wavelength that is longer than corresponding wavelengths associated with a corresponding color of the first beam, the beam splitter to split the display beam to form a first offspring beam comprising the first beam and a first portion of the second beam, and to form a second offspring beam comprising a second portion of the second beam, the first offspring beam and the second offspring beam concurrently incident upon the incoupler at a first incidence position and a second incidence position respectively, the first incidence position different than the second incidence position.

2. The optical element of claim 1, wherein:
   the display beam further comprises a third beam; and
   the beam splitter is to split the display beam to form:
      the first offspring beam comprising the first beam, the first portion of the second beam, and the third beam; and
      the second offspring beam comprising the second portion of the second beam.

3. The optical element of claim 1, further comprising a further beam splitter disposed in a corresponding optical path of the first offspring beam between the beam splitter and the incoupler, the further beam splitter to split the first offspring beam to form a third offspring beam comprising the first beam and a third portion of the second beam, and to form a fourth offspring beam comprising a fourth portion of the second beam.

4. The optical element of claim 1, further comprising a further beam splitter disposed in a corresponding optical path of the second offspring beam between the beam splitter and the incoupler, the further beam splitter to split the second offspring beam to form a third offspring beam comprising a third portion of the second beam and a fourth offspring beam comprising a fourth portion of the second beam.

5. The optical element of claim 1, wherein the beam splitter comprises an about 50/50 beam splitter.

6. The optical element of claim 1, wherein:
   the second offspring beam has a bounce length in the light guide; and a distance between the first incidence position and the second incidence position is other than an integer multiple of the bounce length.

7. The optical element of claim 1, further comprising an outcoupler optically coupled to the light guide, the outcoupler to concurrently direct at least a corresponding portion of each of the first offspring beam and the second offspring beam out of the light guide to form outcoupled beams propagating towards an eye of a user to form the image so that the image is viewable by the user.

8. The optical element of claim 1, wherein the beam splitter comprises one of a dichroic partial reflector, a 50/50 beam splitter, and a polarization beam splitter.

9. The optical element of claim 1, wherein the incoupler comprises a diffractive optical element.

10. A method of operating a display to form an image viewable by a user, the method comprising:
generating a display beam at a light engine, the display beam comprising a first beam and a second beam, the second beam having a color associated with at least a wavelength that is longer than corresponding wavelengths associated with a corresponding color of the first beam;
splitting the display beam using a beam splitter to form a first offspring beam comprising the first beam and a first portion of the second beam, and to form a second offspring beam comprising a second portion of the second beam;
directing the first offspring beam towards an incoupler to become incident upon the incoupler at a first incidence position, the incoupler optically coupled to a light guide; and
directing the second offspring beam towards the incoupler to become incident upon the incoupler at a second incidence position concurrently with the first offspring beam being incident upon the incoupler at the first incidence position, wherein the second incidence position is different than the first incidence position.

11. The method of claim 10, wherein:
the generating the display beam comprises generating the display beam comprising the first beam, the second beam, and a third beam; and
the splitting the display beam comprises splitting the display beam using the beam splitter to form:
the first offspring beam comprising the first beam, the first portion of the second beam, and the third beam; and
the second offspring beam comprising the second portion of the second beam.

12. The method claim 10, further comprising:
splitting the first offspring beam using a further beam splitter to form:
a third offspring beam comprising the first beam and a third portion of the second beam; and
a fourth offspring beam comprising a fourth portion of the second beam.

13. The method claim 10, further comprising:
splitting the second offspring beam using a further beam splitter to form:
a third offspring beam comprising a third portion of the second beam; and
a fourth offspring beam comprising a fourth portion of the second beam.

14. The method of claim 10, wherein the splitting the display beam comprises splitting the display beam using an about 50/50 beam splitter.

15. The method of claim 10, wherein the directing the first offspring beam towards the incoupler and the directing the second offspring beam towards the incoupler comprise directing the first offspring beam towards the incoupler to become incident upon the incoupler at the first incidence position and directing the second offspring beam towards the incoupler to become incident upon the incoupler at the second incidence position respectively, a distance between the first incidence position and the second incidence position being other than an integer multiple of a bounce length of the second offspring beam in the light guide.

16. The method of claim 10, wherein the beam splitter comprises one of a dichroic partial reflector, a 50/50 beam splitter, and a polarization beam splitter.

17. The method of claim 10, wherein the directing the first offspring beam and the second offspring beam comprises directing, using the incoupler comprising a diffractive optical element, at least a portion of the first offspring beam and at least a portion of the second offspring beam into the light guide.

18. An optical element comprising:
a light guide;
an incoupler optically coupled to the light guide; and
a beam splitter disposed in an optical path of a display beam representative of an image, the display beam comprising a first beam, a second beam, and a third beam, the beam splitter to split the display beam to form:
a first offspring beam comprising the first beam, a first portion of the second beam, and the third beam; and
a second offspring beam comprising a second portion of the second beam,
the first offspring beam and the second offspring beam concurrently incident upon the incoupler at a first incidence position and a second incidence position respectively, the first incidence position different than the second incidence position.

19. The optical element of claim 18, further comprising an outcoupler optically coupled to the light guide, the outcoupler to concurrently direct at least a corresponding portion of each of the first offspring beam and the second offspring beam out of the light guide to form outcoupled beams propagating towards an eye of a user to form the image so that the image is viewable by the user.

20. The optical element of claim 18, wherein the incoupler comprises a diffractive optical element.

* * * * *